US010116885B2

(12) United States Patent
Beall

(10) Patent No.: US 10,116,885 B2
(45) Date of Patent: Oct. 30, 2018

(54) SYSTEMS AND APPROACHES FOR REPEATED THERMAL IMAGING DETERMINATIONS

(71) Applicant: HEMA IMAGING LLC, Minneapolis, MN (US)

(72) Inventor: Erik Beall, Eden Prairie, MN (US)

(73) Assignee: HEMA IMAGING LLC, Eden Prairie, MN (US)

(*) Notice: Subject to any disclaimer, the term of this patent is extended or adjusted under 35 U.S.C. 154(b) by 0 days.

(21) Appl. No.: 15/091,317

(22) Filed: Apr. 5, 2016

(65) Prior Publication Data
US 2016/0295208 A1 Oct. 6, 2016

Related U.S. Application Data
(60) Provisional application No. 62/143,160, filed on Apr. 5, 2015.

(51) Int. Cl.
H04N 5/33 (2006.01)
G06K 7/10 (2006.01)
(Continued)

(52) U.S. Cl.
CPC ......... H04N 5/332 (2013.01); G06K 7/10297 (2013.01); G06K 9/00771 (2013.01);
(Continued)

(58) Field of Classification Search
CPC ................. H04N 5/332; G06T 7/0024; G06T 2207/30244; G06T 2207/10048;
(Continued)

(56) References Cited

U.S. PATENT DOCUMENTS 6,845,913 B2  1/2005 Madding et al.
7,454,050 B2  11/2008 Garvey
(Continued)

FOREIGN PATENT DOCUMENTS

WO  WO-2014127431 A1  8/2014

OTHER PUBLICATIONS

Rangel et al., "3D Thermal Imaging: Fusion of Thermography and Depth Cameras", 12th International Conference on Quantitative Infrared Thermography (2014).
(Continued)

Primary Examiner — Joseph Ustaris
Assistant Examiner — Jill Sechser
(74) Attorney, Agent, or Firm — Marshall, Gerstein & Borun LLP

(57) ABSTRACT

A thermal imaging system includes a thermal imaging sensor configured to capture thermal images of assets in an environment, a non-thermal imaging sensor coupled to the thermal sensor and being configured to capture non-thermal images of the assets, an image alignment system configured to adjust an orientation of a present thermal view of the particular asset and a present non-thermal view of the particular asset, a controller configured to control operation of the thermal imaging sensor, the non-thermal imaging sensor, and the image alignment system, and a remote computing device having a change detection system and being configured to receive the captured thermal and non-thermal images of the particular asset. The controller is configured to cause the sensors to capture thermal and non-thermal images. Upon receiving the captured thermal and non-thermal images, the change detection system is configured to detect a change in at least one characteristic of the asset.

20 Claims, 12 Drawing Sheets

(51) Int. Cl.
   *G06K 9/00* (2006.01)
   *G06T 5/00* (2006.01)
   *G06T 7/20* (2017.01)
   *G06T 7/60* (2017.01)
   *G06T 7/00* (2017.01)
   *G06T 3/60* (2006.01)
   *G06T 7/80* (2017.01)
   *G06T 7/33* (2017.01)
   *G06T 7/254* (2017.01)
   *G06K 9/20* (2006.01)

(52) U.S. Cl.
   CPC ............. *G06K 9/2018* (2013.01); *G06T 3/60* (2013.01); *G06T 5/00* (2013.01); *G06T 7/0004* (2013.01); *G06T 7/20* (2013.01); *G06T 7/254* (2017.01); *G06T 7/33* (2017.01); *G06T 7/60* (2013.01); *G06T 7/80* (2017.01); *H04N 5/33* (2013.01); *G06T 2200/24* (2013.01); *G06T 2207/10048* (2013.01); *G06T 2207/30204* (2013.01); *G06T 2207/30208* (2013.01); *G06T 2207/30244* (2013.01)

(58) Field of Classification Search
   CPC ........... G06T 2207/20224; G06T 2207/30204; G06K 7/10297; G06K 9/00771
   See application file for complete search history.

(56) References Cited

U.S. PATENT DOCUMENTS

| | | | |
|---|---|---|---|
| 7,995,830 B2 | 8/2011 | Garvey | |
| 8,300,922 B1 | 10/2012 | Garvey, III | |
| 8,410,441 B2 | 4/2013 | Stratmann et al. | |
| 8,797,409 B1 | 8/2014 | Heinke | |
| 9,100,595 B2 | 8/2015 | Schmieder et al. | |
| 9,241,151 B2 | 1/2016 | Joo | |
| 2004/0164858 A1* | 8/2004 | Lin | G08B 13/19608 340/522 |
| 2004/0201756 A1 | 10/2004 | VanBree | |
| 2006/0139475 A1 | 6/2006 | Esch et al. | |
| 2006/0177150 A1 | 8/2006 | Uyttendaele et al. | |
| 2010/0205553 A1 | 8/2010 | Haigh et al. | |
| 2012/0281098 A1 | 11/2012 | Wagner | |
| 2013/0050453 A1 | 2/2013 | Bergstrom et al. | |
| 2013/0155248 A1* | 6/2013 | Neeley | H04N 5/33 348/159 |
| 2013/0155249 A1 | 6/2013 | Neeley et al. | |
| 2014/0160298 A1 | 6/2014 | Johnson | |
| 2014/0198955 A1 | 7/2014 | Deigmoeller et al. | |
| 2015/0109442 A1* | 4/2015 | Derenne | G08B 21/245 348/143 |
| 2015/0185592 A1* | 7/2015 | Eineren | G03B 17/02 348/375 |

OTHER PUBLICATIONS

Henry et al., "RGB-D Mapping: Using Depth Cameras for Dense 3D Modeling of Indoor Environments", 12th International Symposium on Experimental Robotics, 18-21 (2010).

Non-final Office Action, U.S. Appl. No. 15/091,383, dated Dec. 29, 2016.

\* cited by examiner

SYSTEMS AND APPROACHES FOR REPEATED THERMAL IMAGING DETERMINATIONS

CROSS-REFERENCE TO RELATED APPLICATION

This application claims the benefit of U.S. Provisional Application No. 62/143,160, filed on Apr. 5, 2015, the contents of which are herein incorporated by reference in its entirety.

FIELD OF THE DISCLOSURE

The present disclosure generally relates to thermal imaging and, more particularly, to systems and approaches for conducting automatic determinations of abnormalities using thermal imaging systems.

BACKGROUND

Thermal imaging is a sensing method for non-contact measurement of temperatures of thermally emissive objects. Thermal imaging devices detect radiation emitted by objects by sensing infrared photons and identifying the flux thereof. By using multiple sensing and focusing elements, the thermal photon flux from separate solid-angular fields of view can be obtained in a similar manner as visible-light cameras. As a result, an image of the temperature of objects being captured is generated.

Thermal imaging may be used to observe operating characteristics of electronic and/or mechanical equipment used in any number of industrial environments such as, for example, manufacturing, fabrication, and/or processing facilities. For example, localization of objects with heat contrast can assist in understanding or discerning the location of a conduit in a wall, a source of a water leak, or identifying faulty and/or overloaded circuit breakers. In these examples, a useful image interpretation may be straightforward such that an untrained or inexperienced user may perform it and discern the issue. In some examples, it is advantageous to enhance the interpretability of the images and perform a thorough analysis of the image and the underlying data in order to obtain a binary decision regarding the functional or structural integrity of an object or the determination of a quantitative figure relating to the functional or structural integrity thereof. As an example, in the field of window retrofitting for the purpose of increasing energy efficiency, an estimate of the insulation quality of a window is useful in order to determine the return on investment of a replacement window with a potentially higher insulation quality. In other examples, the determination of excessive current carried through a circuit breaker can identify a failed closed circuit breaker by determining the breaker rating through optical character recognition in a visible-light image, integrating the heat associated with the breaker, and using any number of approaches to calculate the estimated current carried through the breaker to obtain a binary measure of the breaker's integrity and/or a probabilistic estimate of the confidence of the measure. In both of these examples, the determinations are manually calculated and can be error-prone and time consuming.

Thermal imaging may also be incorporated into a predictive maintenance process used to determine the optimum time when equipment should be serviced and/or replaced. Excess heat given off by equipment is often a key indicator of excess wear or impending equipment failure, thus thermal imaging can serve an integral role in maintaining an efficient and productive work environment.

To perform a thermography scan, i.e., to obtain thermal images of thermally emissive objects, thermographers first identify all relevant unique objects and/or equipment, commonly referred to as "assets," which may demonstrate an abnormal temperature-related issue. Thermal images are taken of each asset using a thermal camera while the thermographer adjusts for contrast and brightness, otherwise known as "level" and "span," to set a mid-image temperature and temperature ranges in the image to optimize information presented therein. Setting appropriate level and span values is of particular importance because these values must appropriately surround meaningful temperature ranges in order to see and record abnormalities in thermal images. As an example, if the desired asset is an electrical panel, there may be a high temperature connection that exists under normal operating conditions. To ignore the high temperature connection, the top of the temperature range must be adjusted and saturated to allow for other subtle temperature variances to be seen. As another example, if an abnormally hot connection is identified, the thermographer may still wish to identify milder abnormally hot conditions. Accordingly, the level and span must be adjusted until any subtler issues become apparent. The thermographer can then record the image to be reviewed and analyzed. Thermographers will typically follow a designated route through the environment to sequentially capture images to allow for repeatability on later dates. During or after the process of obtaining images of all desired assets, the thermographer will review the images and ultimately identify areas of interest and/or concern.

Typically, this process must be repeated, e.g., every 6 months, to monitor areas of interest and/or identify any new areas of interest or concern. However, due to the specialized nature of industrial thermography, thermographers are again needed. Thermographers will thus periodically return to the environment, as needed, to re-perform their analysis. In doing so, they will follow a specified image capture route, created based on the initial thermography scan, that allows them to retrace their steps.

Nonetheless, it will be appreciated that using thermographers to obtain subsequent images to be analyzed can be prohibitively costly and time consuming. As an example, the environment (e.g., the manufacturing facility) may have to be shut down to perform the thermography scan and/or one or more employees may have to work with the thermographer to perform the scan. Moreover, the acquisition of thermal images of the same scene at multiple times is typically associated with differences in the camera location and orientation (or camera "pose"). These differences in acquisition can result in images that do not match on a pixel-by-pixel basis, meaning one pixel does not refer to the same part of the scene or object within the scene in all images.

During subsequent scans of the assets where the scanning uses a method to match the images pixel-by-pixel basis, different environmental conditions may be present and can potentially skew the scan results. For example, the ambient temperature, humidity, and/or any other measured variable may vary from one scan to the next, and thus variances between variables may be falsely attributed to component degradation and/or failure.

BRIEF DESCRIPTION OF THE DRAWINGS

The above needs are at least partially met through provision of the systems and approaches for repeated thermal imaging investigation described in the following detailed description, particularly when studied in conjunction with the drawings, wherein.

Figure 1:
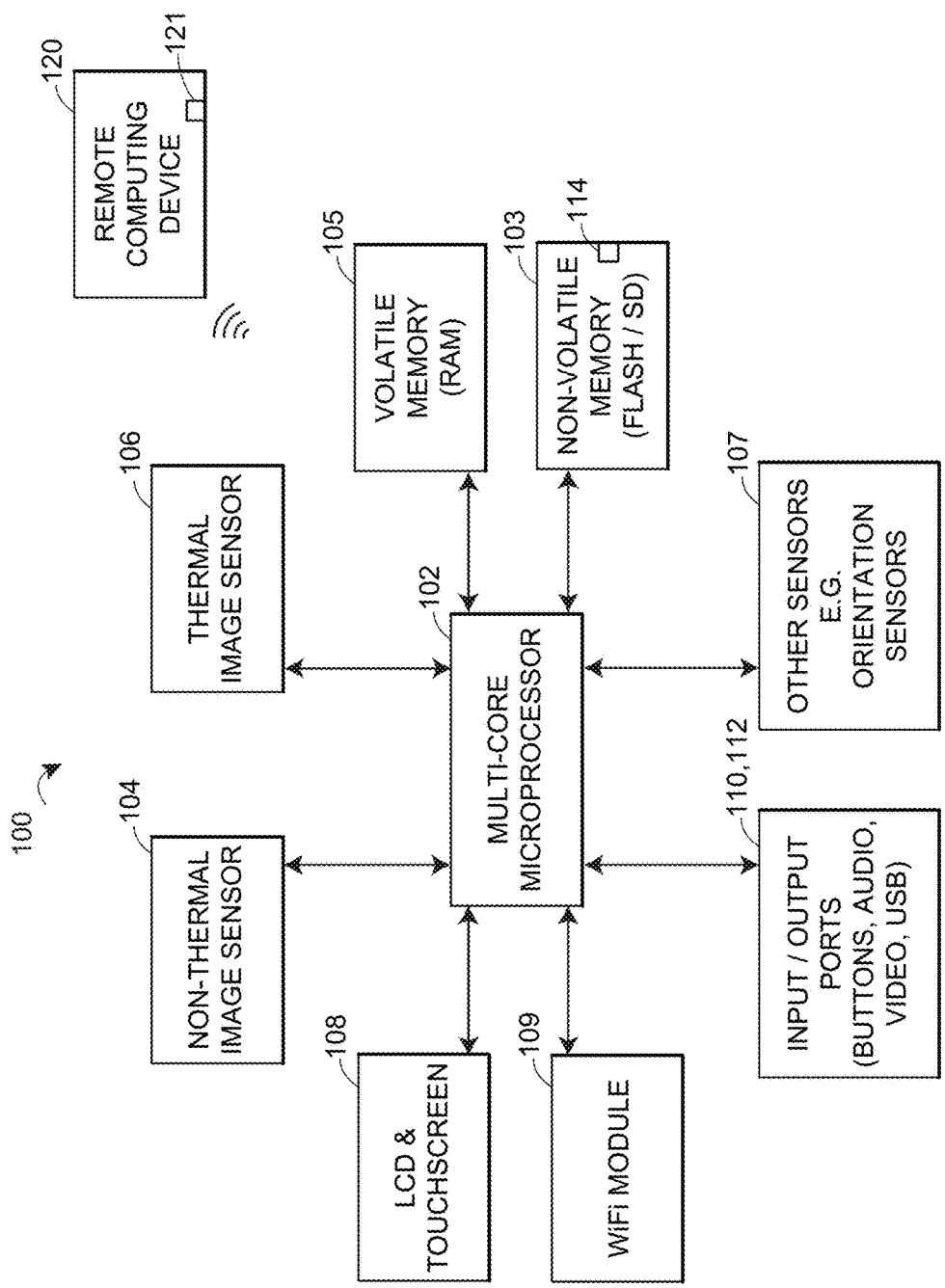
FIG. 1 illustrates a schematic illustration of a thermal imaging device in accordance with various embodiments of the invention.
Figure 2A:
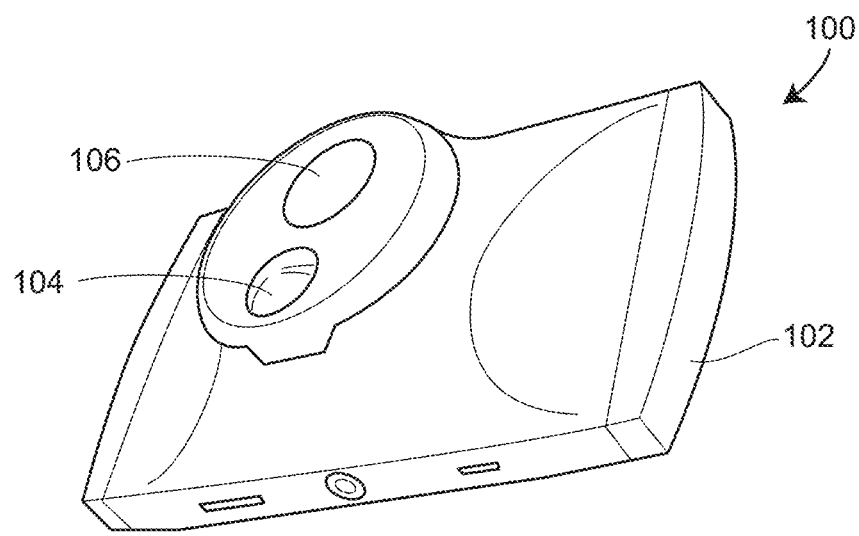
FIGS. 2A and 2B illustrate perspective views of an exemplary thermal imaging device of FIG. 1 in accordance with various embodiments of the invention.
Figure 2B:
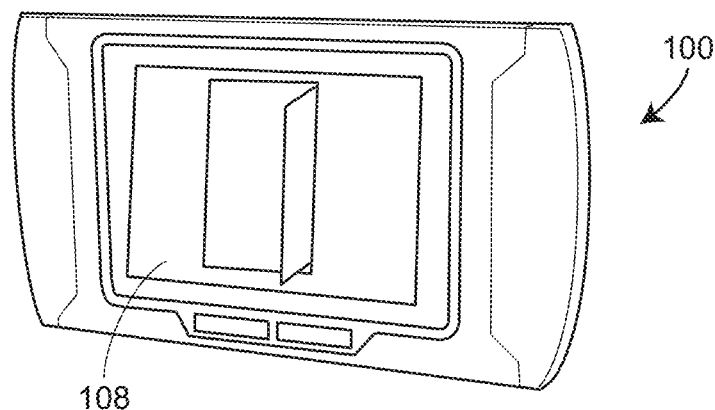

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, systems and approaches for thermal imaging provide for image acquisition and investigation in a repeatable manner. These systems and approaches provide for a process where image acquisition can be made synchronous across pixels within the relevant asset-containing portions of the image scene. A transformed image is created, where each transformed pixel refers to the same part of the scene in all transformed images (taken at different points in time), by using computational rephotography and images from a non-thermal or visible-light camera that is aligned with a thermal camera. For example, an image is taken of a scene containing an asset which may be used as a base image or template for future measurements of that asset. The image may be non-thermal, thermal, or a combination thereof. Alternatively, a representative or average non-thermal image acquisition may be selected as the base image.

In some embodiments, the image or images are transmitted to a computing device for additional processing and/or analysis. Over a specified period of time spanning a number of scans, the assets may generate varying amounts of heat which, as previously discussed, may potentially be indicative of an issue with the asset. The computing device can include a change detection system which detects a change in at least one characteristic (e.g., a captured temperature value) of the asset occurring over the specified period of time.

In some forms, the change detection system generates an image-based threshold using at least one captured thermal and/or non-thermal image. The change detection system can detect a change in the desired characteristic of the asset by comparing the image-based threshold to at least one later-captured thermal image. If the later-captured thermal image exceeds the designated threshold, the change detection system may generate a notification which may be transmitted to an operator to take corrective action. This threshold may be adjustable by an operator by modifying the change detection system.

In embodiments where the change detection system detects a change in temperature values of the asset, an average temperature value of all thermal data associated with the particular asset may be used and included in the captured thermal image. In other embodiments, the temperature value associated with a single pixel may be used by the change detection system. In some examples, the change detection system is configured to calculate a probability distribution of the thermal data and a standard deviation of the captured thermal image.

In some approaches, the thermal imaging sensor may capture additional thermal data of the scene including the ambient temperature value in air contacting an ambient temperature sensor in the thermal imaging sensor system. The change detection system may be configured to adjust for a difference in the ambient temperature value.

In many of these embodiments, the change detection system is configured to use the non-thermal image to determine if a noticeable change in a surface appearance has occurred. In these embodiments, the change detection system examines the color and/or the luminance of the particular asset as compared to a surrounding area.

As illustrated in FIG. 1, in many embodiments, a thermal imaging device 100 includes a controller or processor 102, non-volatile memory 103 having an asset identification system 114 and an image alignment system 116 stored thereon, a non-thermal image sensor 104, a volatile memory module 105, a thermal image sensor 106, any number of additional sensors 107, a display 108, a communication module 109, any number of inputs 110, and any number of outputs 112. In some forms, the thermal imaging device 100 is contained in a single housing. In other examples, components of the device 100 are contained in multiple housings. For example, some components such as the thermal image sensor 106 and the controller 102 may be contained in a first housing, and the non-thermal image sensor 104, display 108, and inputs 110 and outputs 112 may be contained in a second housing. In these examples, a separate handheld computing device such as a cellular telephone, tablet, or any other device may be utilized. Components such as the non-thermal image sensor 104, the controller 102, the display 108, and/or the inputs 110 and outputs 112 may be a part of the handheld device, and the thermal image sensor 106 and any other additional components may be adapted to be coupled to and communicate with the handheld device using any number of approaches known in the art. It is further understood that the device 100 may include any number of additional components.

The controller 102 may be any computing device capable of reading and executing any number of computer-readable instructions and execute arbitrary processing operations. The controller 102 may be a processor or processors, and may be in communication with any number of components such as the volatile and non-volatile computer-readable storage modules 103, 105 (e.g., random access memory and flash drives, hard drives, etc.), the wired and/or wireless communication modules 109, inputs and/or outputs 110, 112, and the like. These additional components may be located on a common circuit board or may be located on an electrically- or optically-connected circuit board. The controller 102 is adapted to control operation of the thermal imaging sensor 106, the non-thermal imaging sensor 104, the display 108, the asset identification system 114, the image alignment system 116, and any other additional components, as will be described in greater detail below.

The computer-readable instructions may be contained in the non-volatile storage medium 103 or a separate connected non-volatile storage medium and direct the processing circuitry to execute code providing various functionality referred to as the operating system. Operating systems are components of computing devices well-known to those skilled in the art and thus will not be discussed in further detail for the sake of brevity. The operating instructions may be complemented by a standard-based application programming interface (API) that provides an extensible model that may be expanded and reconfigured to perform an arbitrary sequence of application instructions even when the sequence of processing is not presently known. The API provides abstractions of various processing capabilities and functions. The functionality provided by software APIs is well-known to those skilled in the art, and thus will not be discussed in further detail.

The asset identification system 114 and the image alignment system 116 may be stored on the non-volatile memory module 103. In other embodiments, the asset identification system 114 and the image alignment system 116 may be located remotely from the device 100 (e.g., on a server), and may communicate with the controller 102 via any known communication method using the communication module 109. The asset identification system 114 is adapted to identify a particular asset from the plurality of assets in the environment. The image alignment system 116 is adapted to align images captured in previous scans with either images currently being captured (or about to be captured) or images captured in scans merely subsequent to the scan performed by the operator of the thermal imaging system to generate images taken from a uniform perspective to ensure the same portions of the asset are captured in each image.

The non-thermal image sensor 104 may be any type of visible, near infrared or other non-thermal wavelength light sensor. In one embodiment, the non-thermal image sensor 104 may be a visible light camera which is sensitive to the visible light spectrum. The non-thermal image sensor 104 is adapted to capture non-thermal light images and/or video of any number of assets in the environment. The thermal image sensor 106 may be any type of imaging sensor adapted to capture thermal images and/or video of any number of assets in the environment. The thermal image sensor 106 may be any type of imaging sensor array which is sensitive to thermal light such as, for example, a microbolometer array, a thermopile array, a thermal diode array, or any other array of sensors which are sensitive to photons and calibrated to produce a non-contact electronic measurement proportional to a temperature of an emissive object in the thermal image array field of view. The non-thermal image sensor 104 and/or the thermal image sensor 106 may transmit the images and/or video to the controller 102 via a wired or wireless connection.

Non-thermal images and thermal images taken by the non-thermal image sensor 104 and/or the thermal image sensor 106 may be combined in a number of ways in order to enhance the information or interpretability of the individual images. Any of the visible-light images, thermal images, or the combined images can be recorded for later examination, displayed on an output visible-light display system (e.g., the display 108) on the device 100, or transferred to a separate display device (e.g., a separate computing device having a screen).

The display 108 may be any type of output visible-light display system such as, for example, a liquid crystal display (LCD) or other display device such as a TFT display. The display 108 may be coupled with a touchscreen interface for combined display and touchscreen user input.

The inputs 110 and outputs 112 may be any type of component or components which allow the operator to interact with the device 100. In some examples, the inputs 110 may be any number of buttons, switches, toggles, actuators, and the like which are coupled to the device 100. In some forms, the inputs 110 may also be icons or buttons displayed on the display 108. The outputs 112 may be coupled to the display 108 to provide a visual representation of processing, analysis, or any other task executed by the controller 102. Other examples of uses for the inputs 110 and/or outputs 112 are possible.

Sensor Calibration

Figure 3:
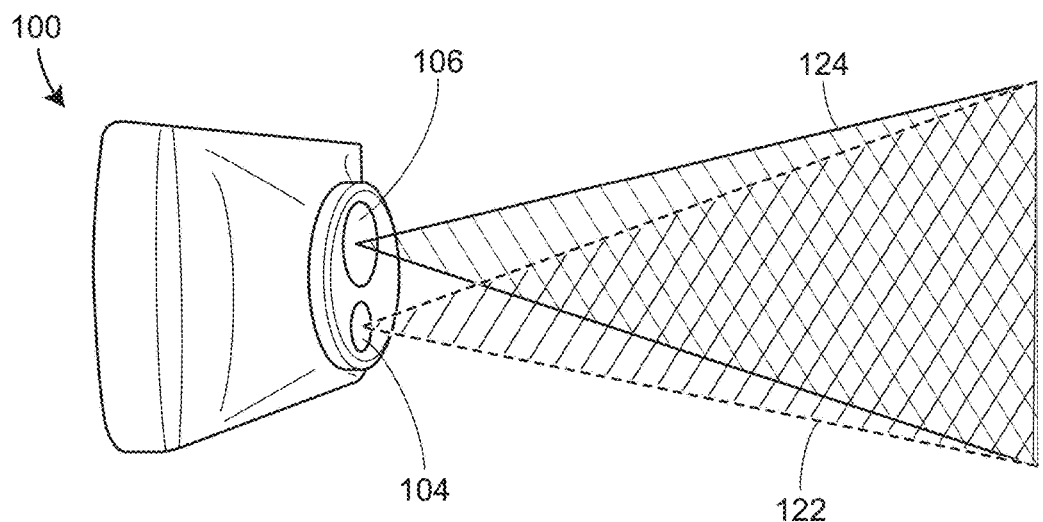
FIG. 3 illustrates a perspective view of the exemplary thermal imaging device of FIGS. 1 and 2, further illustrating fields of view of a thermal camera and a non-thermal camera in accordance with various embodiments of the invention.

As illustrated in FIG. 3, the non-thermal image sensor 104 generates a first field of view 122 (denoted by dashes or "−") and the thermal image sensor 106 generates a second field of view 124 (denoted by plusses or "+"). The non-thermal image sensor 104 and the thermal image sensor 106 are arranged such that the fields of view overlap at area 126. This overlapping field of view 126 represents a combined imaging field of view, and may utilize computer-readable instructions for performing a matched field of view transform and image combination operations when used with the non-thermal image sensor 104 and thermal image sensor 106. A parallax offset and field of view transformation difference between the combined images can be corrected by applying a distance-dependent transform matrix.

Figure 4:
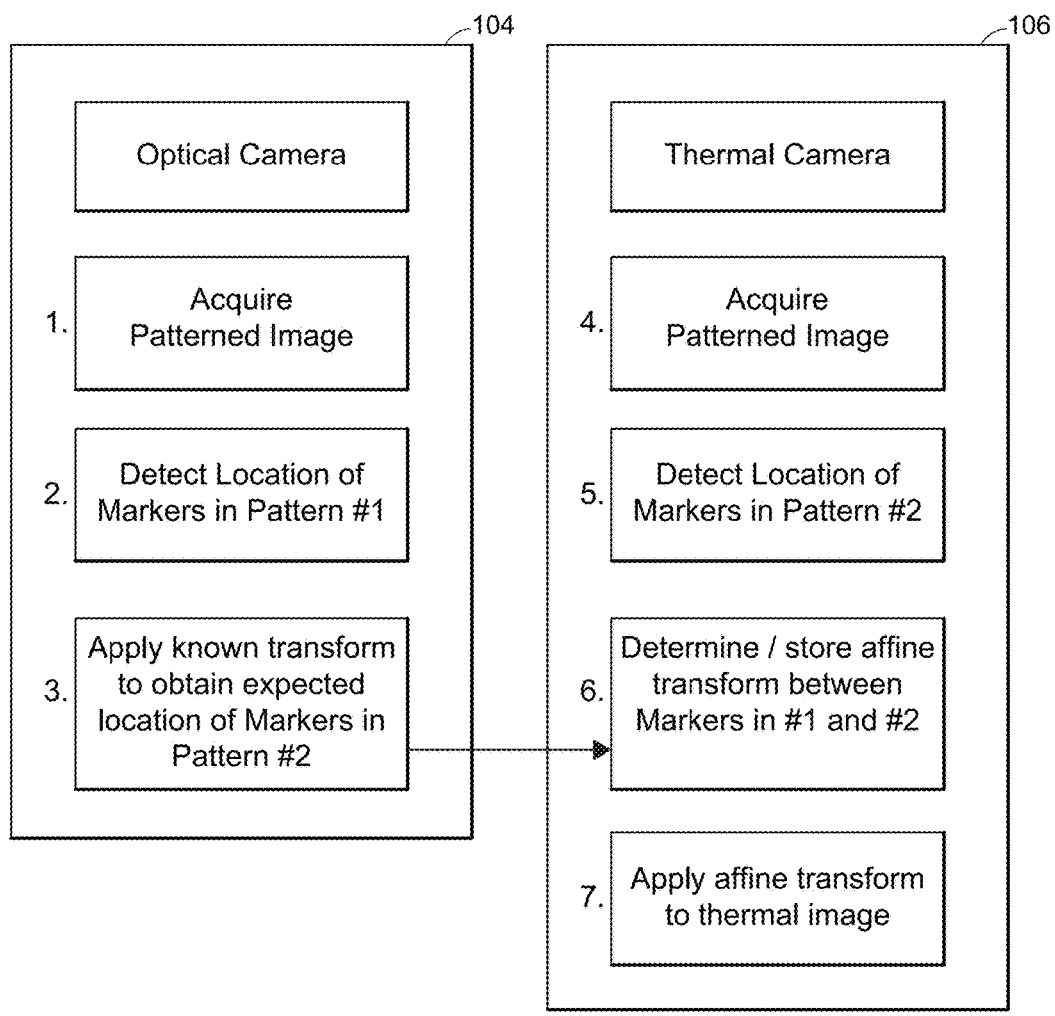
FIG. 4 illustrates an exemplary flowchart for calibrating the optical image sensor and the thermal image sensor of FIGS. 1-3 in accordance with various embodiments of the invention.
Figure 5:
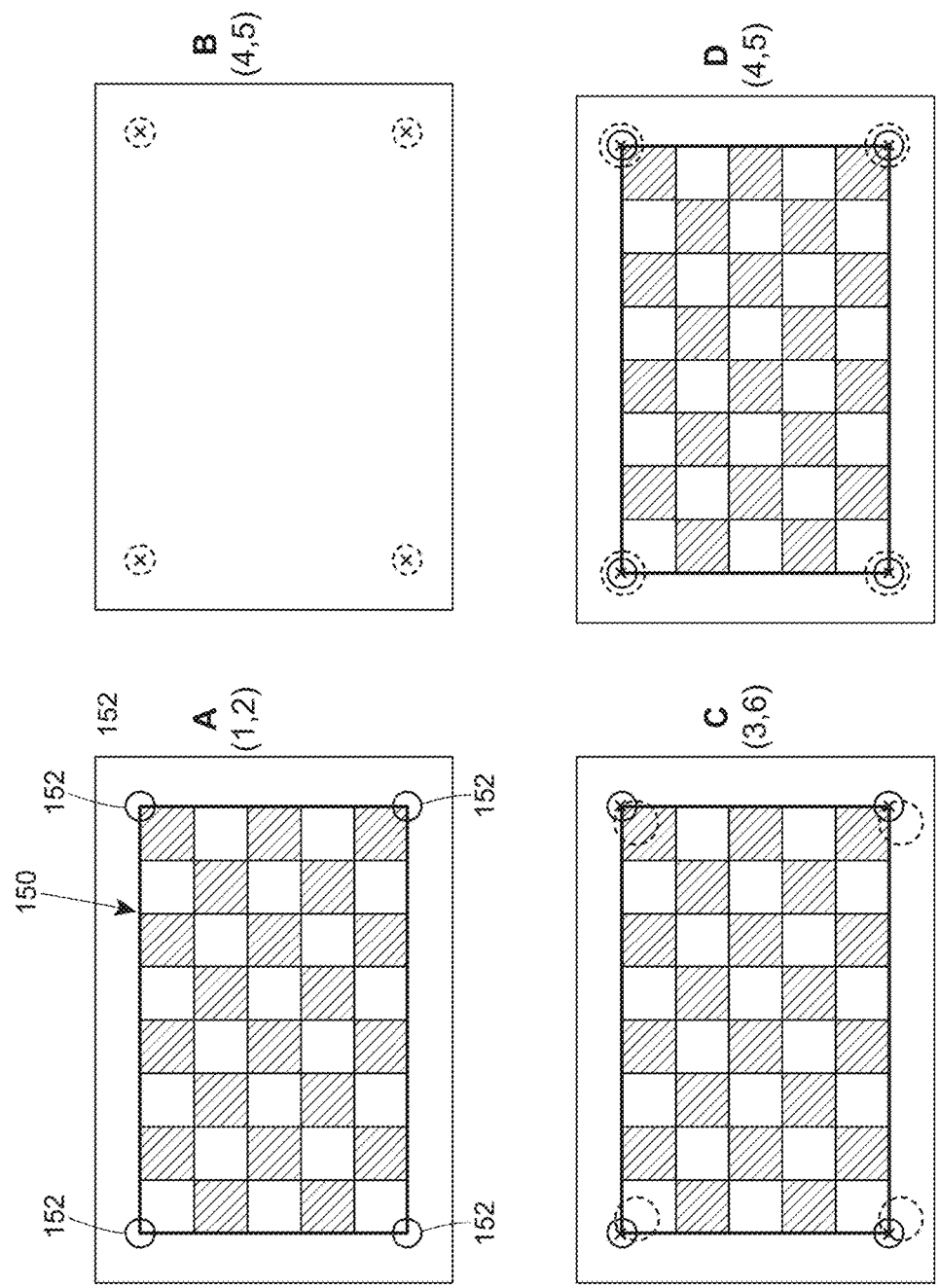
FIG. 5 illustrates an exemplary visualization of the flowchart for calibrating the optical image sensor and the thermal image sensor of FIG. 4 in accordance with various embodiments of the invention.

Turning to FIGS. 4 and 5, in some examples, the controller 102 may be adapted to spatially calibrate the non-thermal image sensor 104 and the thermal image sensor 106 despite having different wavelength sensitivities. In FIG. 5, visualization "A" depicts an image obtained from the non-thermal sensor 104, visualization "B" depicts an image obtained from the thermal image sensor 106, and visualizations "C" and "D" depict a combination of the images obtained from the non-thermal image sensor 104 and the thermal image sensor 106. Other approaches for spatially calibrating the fields of view of the non-thermal image sensor 104 and the thermal image sensor 106 are well known to those skilled in the art.

In these examples, the environment can include structured elements consisting of a printed pattern (e.g., a checkerboard pattern 150) visible by the non-thermal image sensor 104. Any number of markers 152 are placed at the corners of the pattern 150. These markers 152 may either be heated or cooled such that their temperature varies from the ambient temperature sufficiently to be resolved from the background by the thermal imaging sensor 106.

With reference still to FIGS. 4 and 5, at step 1 and step 4, the non-thermal imaging sensor 104 and thermal imaging sensor 106 (having overlapping imaging fields of view) are directed at the scene such that the pattern 150 is within the image field of view of the non-thermal imaging sensor 104 (as illustrated in visualization A) and the thermally visible markers 152 are within the image field of view of the thermal imaging sensor 106 (as illustrated in visualization B). The visible structured elements (e.g., the elements viewable by the non-thermal image sensor 104) are resolved within the visible field of view using any number of approaches known in the art such as, for example, computer vision software. At step 2, the visible image is processed to resolve the visible image field of view pixel location of the inner corners of the pattern 150 on the visible image, and at step 5, the thermal pixel location of the four heated or cooled markers 152 is resolved within the thermal image field of view using image thresholding, segmentation, spatial filtering, and/or averaging. Other approaches to resolving the thermal pixel locations are possible.

At step 3, and visualization C, a known transform is applied to the image obtained from the thermal image sensor 106 to obtain an expected location of the thermal markers 152 on the visible image using the controller 102. In other words, the non-thermal image field of view is matched to the thermal image field of view. As shown in visualization C, the estimated location of the thermal markers illustrated in broken lines does not match their location calculated from the visible camera. At step 6, an affine two-dimensional spatial transformation that matches these locations is performed by the controller 102. At step 7 and visualization D, the affine transformation is applied to the thermal image and results in a spatially calibrated thermal image matching the visible image field of view. The matrix describing this affine calibration is then stored for subsequent uses of the device as long as the relative positioning or fixation between the non-thermal image sensor 104 and the thermal image sensor 106 is unchanged during use. Accordingly, the non-thermal image sensor 104 and the thermal image sensor 106 are properly calibrated to allow images from each sensor to be aligned with each other.

It is understood that this process may be repeated for different distances between the sensing body and the imaging plane in order to produce a set of distance-dependent calibration matrices. These distance-dependent calibration matrices can be used to correct images acquired at a range of different distances having differing alignment parallax offsets. In some examples, the operator is directed to select a fixed distance before acquiring images. This distance can be used to select a fixed image transform matrix to be used in all subsequent image acquisition image processing to align the thermal sensor image with the visual sensor image. In most cases, the image transform calibration constants are determined once for a particular spatial arrangement of the thermal image sensor and the non-thermal image sensor.

Image Alignment

In some examples, thermal and non-thermal images of an asset may be aligned in a uniform manner to allow for accurate analysis of changes to the thermal profile of the asset over a specified time period. In these examples, an image is taken of the asset or an environment containing the asset and is used as a template for future measurements of that asset. This image or images may be non-thermal, thermal, both thermal and non-thermal, or a combination thereof, and may be captured by a professional thermographer. When a subsequent measurement of the particular asset of interest is desired, the image alignment system 116, controlled by the controller 102, causes the template scene image to be shown on the display 108 linked to the imaging device 100.

The operator may then prepare to acquire images of the environment using approximately the same imaging orientation and distance from the asset as well as the same overall field of view of the environment, such that the environment matches the template environment as closely as possible. While acquiring the matching image, the original template environment image may be shown on the display 108 as a transparent and/or translucent overlay on the present image, the present image may be processed and displayed as a transparent and/or translucent overlay on the template image, or only the template image or the present image may be shown. In some examples, the template or present image may be further processed prior to display by first applying edge-detection image processing (e.g., Canny edge detection) to the template image and/or the present image, and then overlaying the one processed image onto the other processed template or present image.

Figure 6:
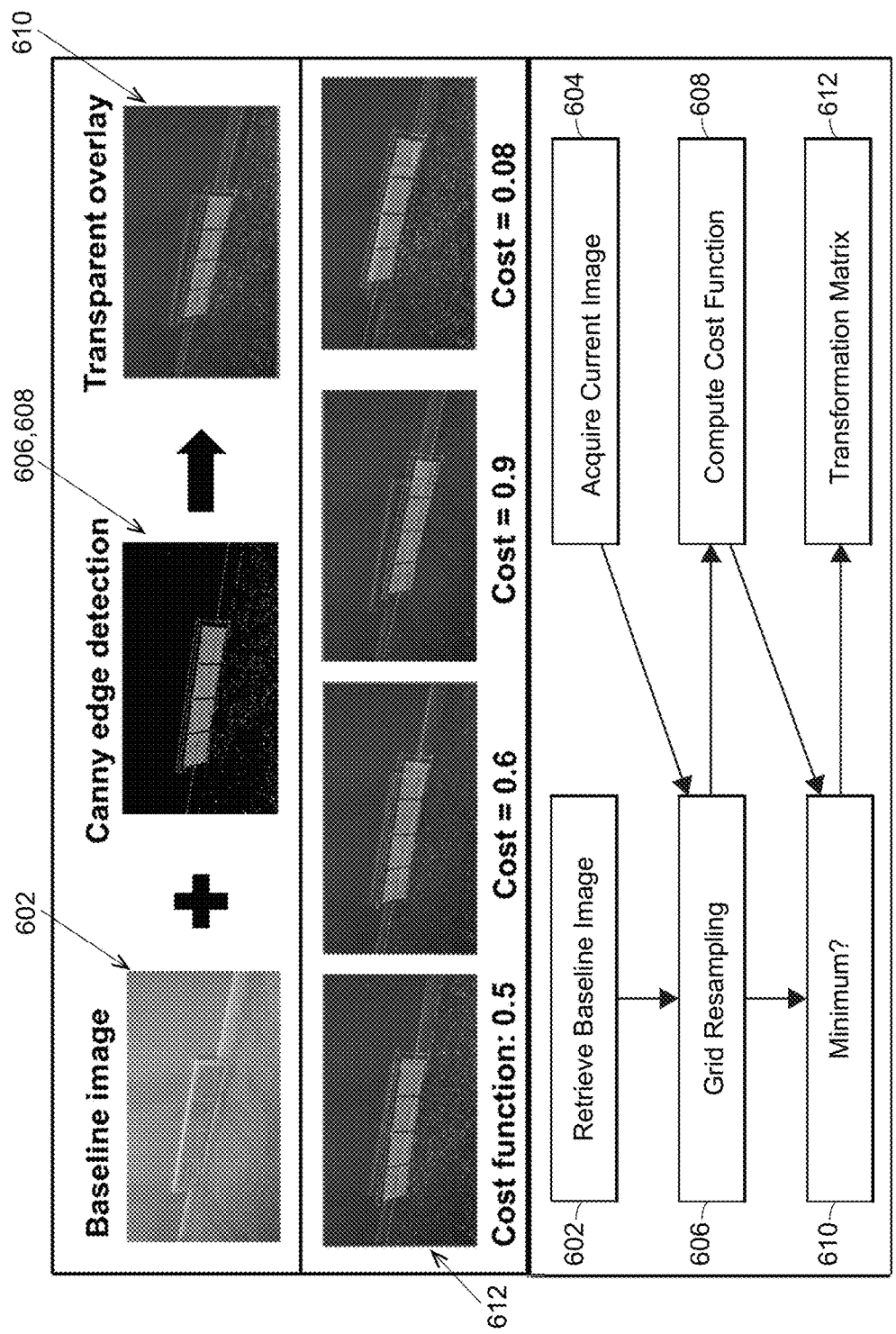
FIG. 6 illustrates an exemplary approach for aligning images taken at different times using an image alignment system in accordance with various embodiments of the invention.

Numerous computational approaches are known for aligning images. Some of these approaches are classified as intensity-based alignment or feature-based alignment. In these approaches, the alignment transformation between the images may be classified as either a linear or a nonlinear transformation. As a non-limiting example using intensity-based image registration to determine a linear transform that aligns images, and as illustrated in FIG. 6, an approach 600 for aligning images taken at different times using an image alignment system is described. There are numerous variations in methods for performing intensity-based alignment of images known to those skilled in the art including various optimization methods for adjusting the transformation such as, for example, markov random fields, New Unconstrained Optimization Algorithm (NEWUOA) or gradient descent, various cost functions for computing difference between transformed images or image histograms such, as but not limited to, least squares, mutual information, correlation ratio, local pearson correlation or normalized correlation, various interpolation methods and various transform restrictions such as, for example, rigid, partial affine with scale plus rigid or full affine.

In this example, baseline and current images (of the current field of view) are acquired at 602, 604. The image alignment system 116 is then applied to the baseline image and/or the present image, and overlays the present image onto the template, baseline, or original image via grid resampling at step 606. At 608, a least squares cost function is computed of the sum of squares of the difference between the original template image and a processed version of the present image being acquired. Image processing applied prior to the computation of the cost function may include spatial transformation, histogram normalization, image segmentation, thresholding, spatial filtering, edge detection, or other such processing known by those in the art. The image difference cost function may be computed using a number of approaches such as, for example, least-squares difference, normalized mutual information, local Pearson correlation and the like. Other examples are possible.

The cost function may be displayed via the display 108 to assist the operator in determining how close or far the present image is from the previous image. In other examples, the cost function may be used after acquiring many images to allow for post-hoc selection of an image or images that most closely match the template scene, or the cost function may be used as a minimization function in an iterative search for a linear image transformation to spatially align the images such that the images match the template more closely.

In one non-limiting example, the template image and the present image are compared after processing by spatially transforming at least one of the images with a linear transformation matrix, by computing the sum of squares of the difference between the processed template and present images as the cost function. The cost function is then used to search for a linear image transform coregistration that minimizes 610 this cost function. By searching for a transform matrix 612 that minimizes the cost function, the transformation that results in the best spatial match between template and present images is determined. Many variations of search strategy are possible, such as, for example, hierarchical gradient descent. Further quality measures such as the residual least squares difference may be used to determine success of the registration procedure. It is understood that the image alignment system 116 may apply image processing to a previously- and/or presently-captured non-thermal and/or thermal image of the particular asset using the non-thermal image sensor 104 and/or the thermal image sensor 106.

Figure 7:
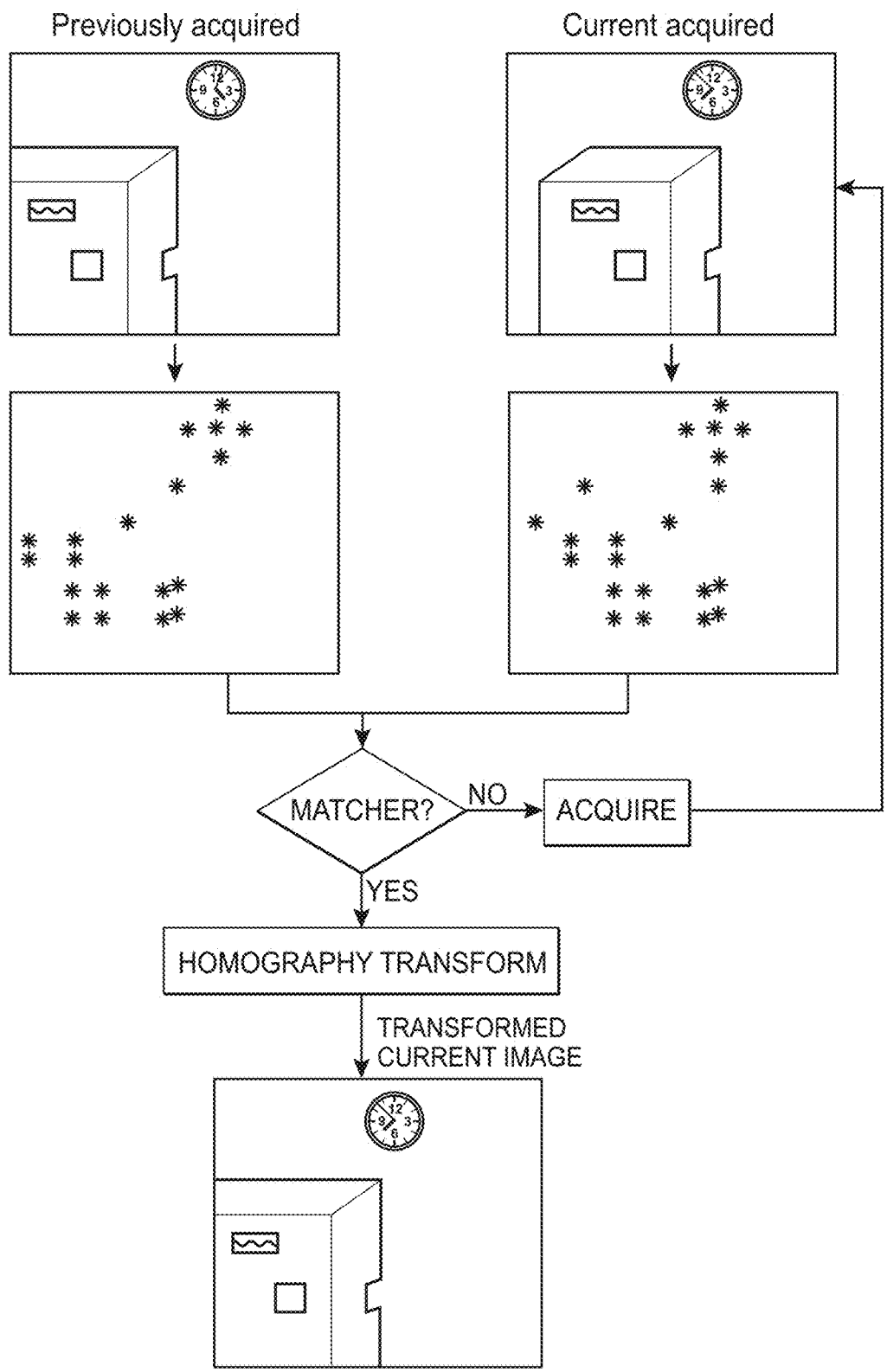
FIG. 7 illustrates an exemplary approach for aligning images taken at different times using a feature-based image alignment system in accordance with various embodiments of the invention.

As a non-limiting example and as illustrated in FIG. 7, image features are used to align the images. In this example, the image alignment system 116 computes and stores any number of image feature vectors describing the environment to be recalled during subsequent scans. The feature descriptors can be computed using any known feature-based description method, such as, for example, descriptors that are less sensitive to camera pose and image intensity. Examples include, but are not limited to, features based on a histogram of oriented gradients, oriented binary robust independent elementary features, binary robust invariant scalable keypoints, fast retina keypoints and others.

The image alignment system 116 may determine feature vectors in the current image and compare these vectors with the stored vectors using approaches known to those skilled in the art such as, for example, random sampling, consensus, nearest neighbors, or brute force matching. In the event of a correspondence above a threshold value determined to indicate a match, the matched feature points from the current image and the stored feature points may be passed to a method for determining the perspective transformation between matched points and the perspective transformation applied to the current image. If the perspective transform can be approximated by an affine homography transform, then the perspective transform can be decomposed and used similar to a linear rigid or affine transformation matrix. The resulting perspective-transformed current image may pass through a secondary image co-registration procedure with the stored previously acquired image as the registration target and the resulting image transformations may be combined with the perspective transform and the resulting transform applied to the current non-thermal image data or paired thermal image data. The image alignment system 116 may then allow the previous thermal and/or non-thermal images to be compared with the present thermal and/or non-thermal images to visualize and identify changes between the current scene and the baseline scene using the display 108.

In some examples, the image alignment system 116 may invert the transformation and apply the inverted transform to the previously-acquired images instead of the current image. In some examples, the thermal level and span settings from the baseline or current thermal image are applied to the current or baseline thermal image while spatially matching the visual images, combining the visual to thermal sensor calibration transform with the visual scene transform from the image alignment system 116 and applying the derived transform or its inverse to one of the thermal images and processing both baseline and present images in order to display both at the same time blended or side-by-side. The baseline image may be the first image acquired of an asset, it may be updated periodically with contributions from later images, and/or it may be replaced by a later image, thus, it will be understood that the term "baseline image" can refer to a previously acquired image.

In some examples, the thermal image data obtained from one asset may be compared with thermal image data from a different, identical asset (e.g., two separate electrical panels). In these examples, the appearance of the two assets is sufficiently similar to allow a stable image homography transform or image co-registration, the transform to be applied to the second image, and images to be produced which appear to have been taken from the same perspective relative to the similar asset. The operator may in turn directly compare thermal patterns of the two objects by switching between the two images or performing a subtraction or other pixel-wise image transform to enhance the identification of differences.

In other approaches, the image alignment system 116 includes an inertial monitoring unit (IMU) coupled thereto. The IMU allows the camera orientation with respect to ground to be recorded and can be used to annotate the base image's orientation. This annotation can be used to estimate the orientation component of the pose correction, which is beneficial for later acquisition and computation by constraining the estimated pose to reduce errors and increase speed in computing the full orientation plus translation pose correction.

The IMU orientation with respect to ground can also be used to guide subsequent repeated image scene acquisition by feeding back the difference between the current sensor orientation and the base sensor orientation. It is noted that is not necessary that there be an IMU present for the full pose correction to be performed. During acquisition of subsequent images, the user must maintain a suitable degree of similarity in camera pose to the base camera pose. This similarity may be enforced either using landmarks and knowledge of the scene to be acquired (e.g. an indicator on the floor denoting "stand here for asset A" or simply operator awareness of the scene and functioning of the present system), the base image display or base image transformed in some manner (as previously described), or a displayed estimated pose correction between the current image to the base image can be used to guide the user. A real-time pose correction can be displayed in simplified form (e.g. which direction to move the camera center) in order to guide the camera to match the current scene with the scene in the representative base image. A transform between the current scene image and the base image can be generated through image registration, which may involve a perspective transform for all but small pose differences, or may involve a linear transform particularly if the pose difference is small.

The results of a real-time image transform can be used to help guide the user by assisting in the positioning of the camera, such as by indicating whether distance must be increased or decreased, or by displaying an indication signal proportional in some manner to the cost function of the image transform. Furthermore, the guidance can be simplified and separated into independent degrees of freedom for ease in adjusting only one degree of freedom at a time, because adjusting multiple degrees of freedom at once can be too difficult to perform. The image transform returned by the registration routine can be decomposed into translation, rotation and scaling components. The scaling component relates to the difference in distance between the base and current acquisition, thus a scaling factor greater or less than 1 indicates a difference in distance and a scaling factor of 1 means there is no detectable difference in distance. Accordingly, scaling can be used to guide the user to the correct image acquisition distance.

Figure 8:
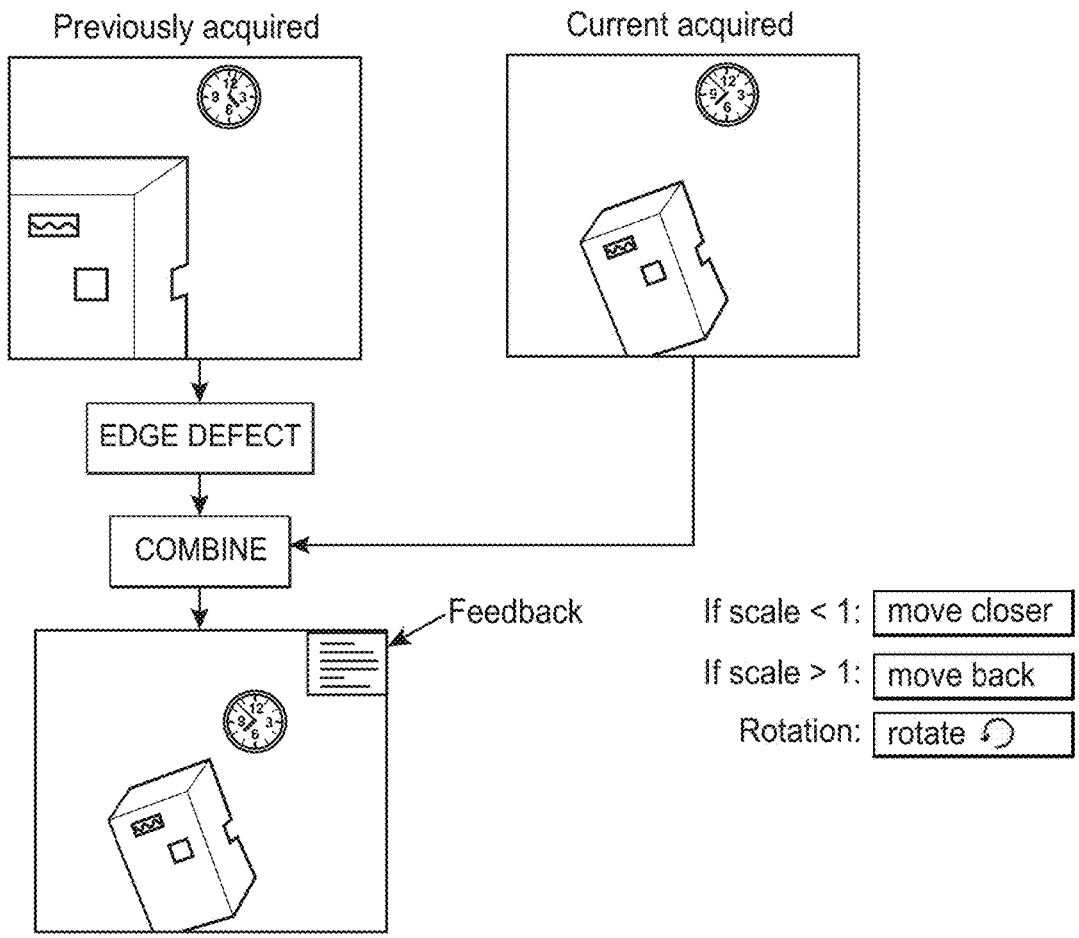
FIG. 8 illustrates an exemplary approach for aligning images taken at different times using a transform-derived feedback system in accordance with various embodiments of the invention.

As illustrated in FIG. 8, from the full pose correction or linear transform, the translation and rotation can be used to direct the operator to adjust the location and orientation of the camera in the plane perpendicular to the imaging axis such that it matches the location and orientation of the camera in the base camera pose. Alternatively, the orientation difference can be ignored if below a suitable threshold and any orientation differences can be handled post-acquisition by a feature-based, intensity-based, or other image alignment process performed by the image alignment system 116. Once the total transform difference from unity is below a pre-defined threshold or error bound, the thermal and visible image or set of suitably below-error images are saved. Following acquisition, a finer-grained (higher accuracy) post-hoc co-registration of the acquired visible image or images to the base visible image is computed, and applied to the visible and thermal images, to more closely match the images to the base image. By synchronizing images on a pixel-by pixel basis, pixel-wise statistical tests may be performed directly on the images.

Figure 9:
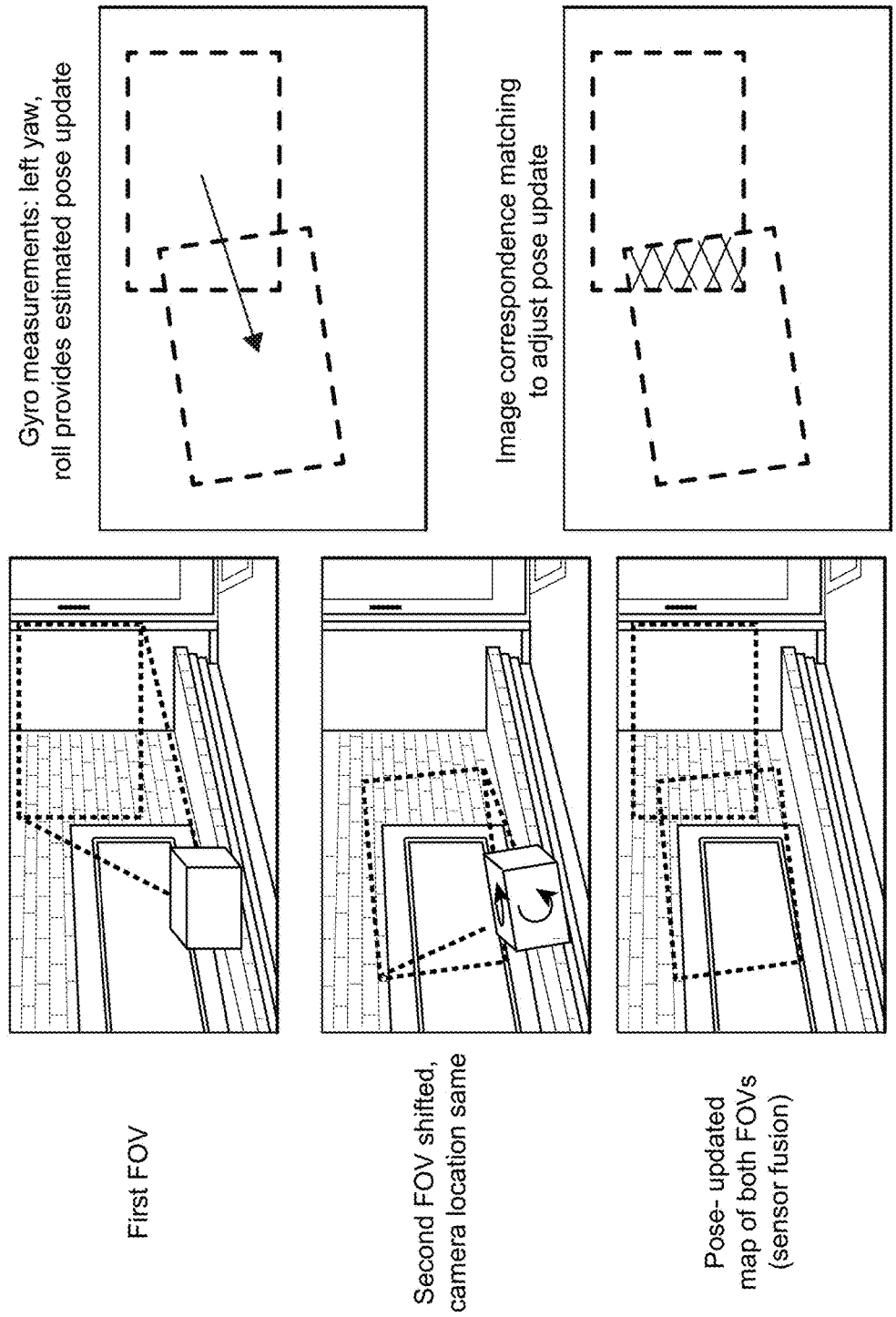
FIG. 9 illustrates an exemplary approach for aligning images using a feature-based image alignment system and an orientation sensor-assisted alignment system in accordance with various embodiments of the invention.

In some examples, and as illustrated in FIG. 9, the device 100 may utilize both feature-based alignment and orientation sensor-assisted alignment. In these examples, the image coregistration is decomposed into an image scale component, a rotation component, and a translation component. The components are used to display indicators on the display 108 which correspond to an intended repositioning and re-orienting of the device 100 so as to match a present pose (or orientation) of the device 100 with a previous pose of the device 100. The orientation system may include sensors such as an accelerometer, an inclinometer, a gyroscope, and/or an inertial monitoring unit, among other components. By measuring the pose of the system when capturing the previous or baseline image of the asset, this information may be used in subsequent scans to initialize an image coregistration search routine, thereby reducing error and time in the computation.

Image Analysis

As illustrated in FIG. 7, reproducibly-acquired images of the same scene can be stored and analyzed to detect changes over time using image post-processing (e.g., the change detection system 121) based on a subset and/or a full set of images or other information. The captured thermal images can be transmitted, via a wired/wireless connection, to the remote computing device 120, where the analysis is performed. In many approaches, a web-based browser, a software package, and/or an application or "app", disposed on either the remote computing device 120 or the controller 102, is used to access the change detection system 121 which references the thermal images uploaded thereto. The remote computing device 120 may utilize a sockets-based connection to communicatively couple the remote computing device 120 to the inputs 110 and/or outputs 112. The captured thermal and non-thermal images and any additional thermal data (such as alignment cost functions and image transforms computed to the baseline captured image) are transmitted to the remote computing device 120, which stores the images, and the associated relevant data acquired with the images, as unique records in a database or as files in any known type of file system. In a non-limiting example, the operator can observe a sequence of images acquired from the same scene and, using the display 108, switch between images acquired on different dates.

For the purpose of tracking significant changes or deviations over time to a particular asset, a baseline set of measurements can be identified by the change detection system 121. In FIG. 7, a simplified example of a series of thermal images is taken separately over a given time period. The change detection system 121 may select of a subset of these images to be used as the baseline images. Using these baseline images, the change detection system 121 can create an image-based threshold based on one or more variations in the images. As used herein, "image-based threshold" means a threshold that varies on a pixel-by-pixel basis. However, it will be understood that in other examples, the threshold may be a fixed whole-image threshold whereby the threshold varies on an image-by-image basis.

Portions of the images having characteristics (e.g., temperatures) exceeding the image-based threshold are detected by the change detection system 121. In examples in which the threshold is a fixed whole-image threshold, portions of the image with larger changes that exceed the fixed whole-image threshold are detected by the change detection system 121. A standard deviation image can be computed by taking the standard deviation over time at each pixel and storing the result in each pixel to generate a standard deviation image. An average image can be computed by taking the average over time at each pixel and storing the result in each pixel to generate an average image. Statistically significant changes to the images over time can be revealed by setting a pixel-by-pixel threshold at the average image plus some factor of this standard deviation image, such as, for example the average plus 2.0 standard deviations for a 5% significance. In other examples, the operator can request the use of other thresholds to be displayed on the average thermal image, the baseline thermal image, or even a baseline non-thermal image. The change detection system 121 can identify times when the thermal and/or non-thermal image exhibit a statistically significant change (e.g., a change greater than the set standard deviation) from the baseline.

It is understood that emissivity and other physical characteristics commonly result in inaccurate temperatures in thermal images. However, if the purpose of the statistical analysis of a timeseries of thermal images is to merely detect a significant change in an observed thermal image value, the thermal image value need not relate the accurate object temperature so as long as the emissivity is suitably high.

Figure 10:
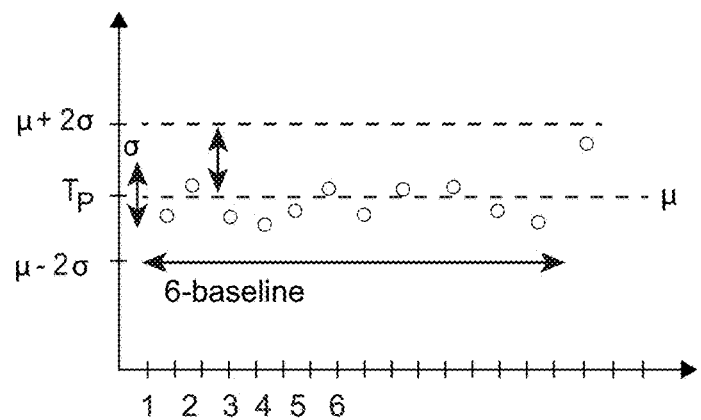
FIG. 10 illustrates an exemplary visualization of a thermal imaging system where a plurality of captured images are analyzed to determine whether a change has occurred in accordance with various embodiments of the invention.
Figure 10:
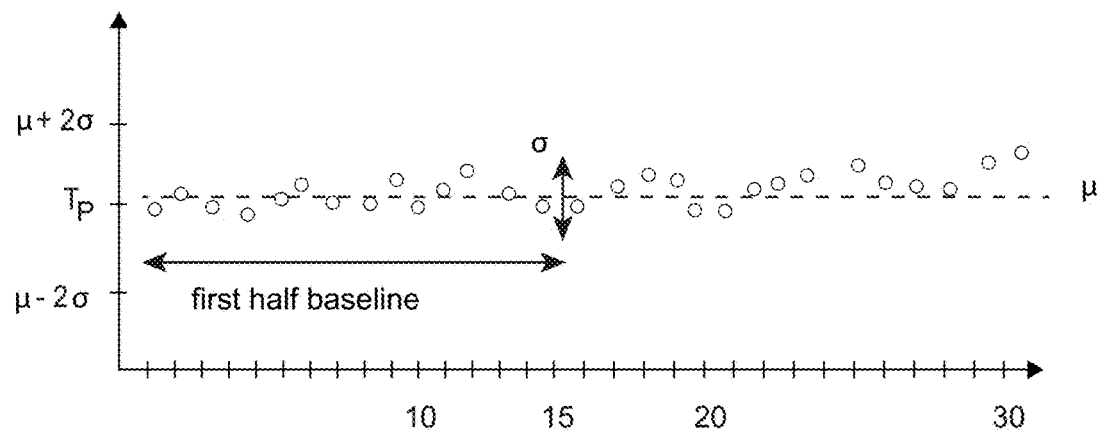

FIG. 10 illustrates how the change detection system 121 can detect changes in temperatures that fall outside of the image-based threshold. As illustrated in FIG. 10, the change detection device 121 computes the standard deviation of the pixel temperatures for a first set (in this case, six) of images (i.e., baseline images), and a threshold is set at two standard deviations from the mean temperature value of the first set of images. It is understood that in practice, the sample used to compute standard deviation can increase over time and incorporate later measurements. The standard deviation can be re-computed as additional data are collected, as long as the later measurements are not significantly different from the first half (e.g., the first six measurements until the first half has greater than six measurements). In FIG. 10, the particular pixel being analyzed by the change detection system 121 is circled. The graph in FIG. 10 depicts a pixel temperature Tp along with a first threshold T1 (which, in this example, represents a reduced temperature from the baseline average) and a second threshold T2 (which, in this example, represents an increased temperature from the baseline average). As shown, the final measurement exceeds the positive threshold T2; thus the change detection system 121 is configured to generate a notification. In some examples, the notification is in the form of an alarm or message transmitted to the controller 102 to be displayed at display 108. In other examples, the alarm or message is displayed by the remote computing device 120. Changes in the characteristics (e.g., temperatures, image intensity, etc.) of the asset over time can be highlighted and/or brought to the attention of the operator by displaying an image illustrating the average thermal values of the sequence of thermal images relative to the standard deviation. Other examples are possible.

Figure 11:
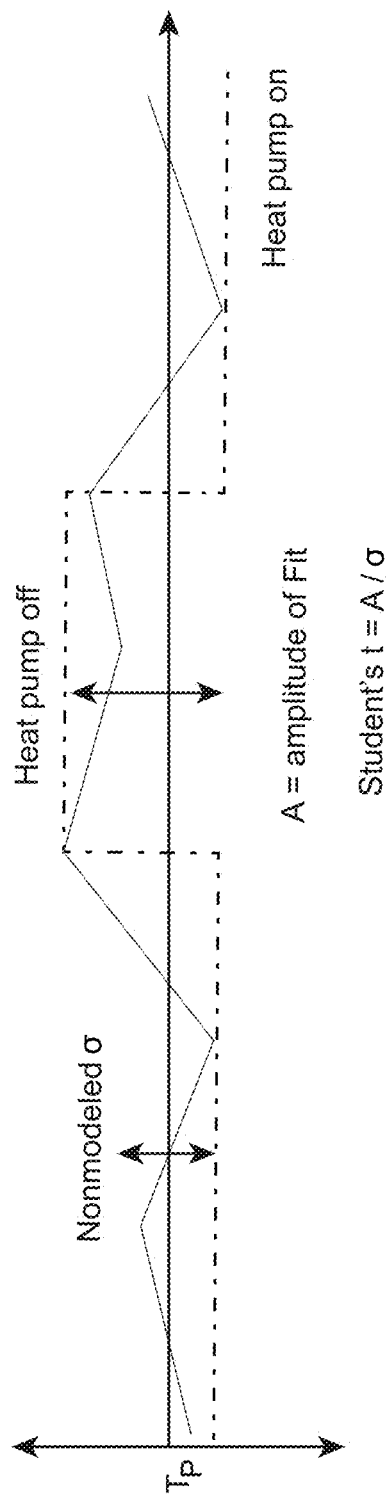
FIG. 11 illustrates an exemplary visualization of a thermal imaging system where a plurality of captured images are analyzed and a known change in state can be modeled with a function to determine whether a change has occurred in accordance with various embodiments of the invention.

As illustrated in FIG. 11, in some examples, the change detection system 121 can perform a more complex image analysis, such as when a known state change can be modeled using a function. In a non-limiting example, the function may represent the state of an asset such as a heat pump over a given time such that all times in the function are set to 0 when the heat pump is operational and all times in the function are set to 1 when the heat pump is not operational. The change detection system 122 can analyze the image data for significant changes correlating with this known change in state using any number of approaches, e.g., a least-squares fit of this function to the time series data.

In the illustrated example, the fit amplitude over pooled variance is distributed as a Student's t, whereby the term "Student's t" represents a normal distribution, and its associated probability computed and a threshold selected. For example, a timeseries with an unmodeled standard deviation of 0.5 and a fit amplitude of 1 would result in a t-value of 2, with an associated null probability of 5%. Pixels with a significant fit to the designated function can be identified and displayed in this manner. The least-squares fit or any other method used for regression analysis is dependent on how well the function models the change in state and does not model any other deviation occurring over time. The function and corresponding data are examined for how well-conditioned the function is, prior to proceeding with the analysis so that the operator can alter the function correspondingly to obtain a more meaningful analysis.

In some examples, the change or change divided by standard deviation in thermal image data from baseline thermal image to current thermal image from multiple different assets can be supplied along with a vector containing the post-hoc determinations of the current status of each of the assets to train a support vector machine (SVM) classifier or neural network machine learning system to generate a system for the automatic determination of asset status from image data. In these examples, the thermal image data can be first converted to an asset geometry-invariant representation, such as the histogram of the change in thermal values from baseline to current image, or a histogram of the change divided by standard deviation at each pixel, or the vector of change in thermal values from baseline to current image, or the integrated total residual of a regression subtraction of the current image with the baseline image, or other techniques known to those skilled in change detection.

Each scan of an asset may be captured under different ambient conditions. These changes in ambient condition can be reflected in each scan, reducing the ability to draw meaningful conclusions from any trend or statistic derived from such data. It is possible to model the effect of each change in ambient conditions upon the acquired thermal image and thereby correct for the effect of these changes and enhance the ability to draw meaningful conclusions from data analyses. A change in ambient temperature, where ambient refers to the temperature of the air in the immediate environment surrounding and in contact with the asset, results in a change in the surface temperatures of an asset with its own characteristic temperature distribution. In most thermography applications, this change is approximately linear and additive. For example, if the ambient temperature is 25 C on day 1, and the asset has surface temperatures ranging from 22 C to 45 C, and on day 2 nothing has changed regarding the asset and ambient conditions except the ambient temperature has risen to 30 C, an increase of 5 C, then the surface temperatures of the asset will rise by the same amount to result in a range of 27 C to 50 C.

Figure 12:
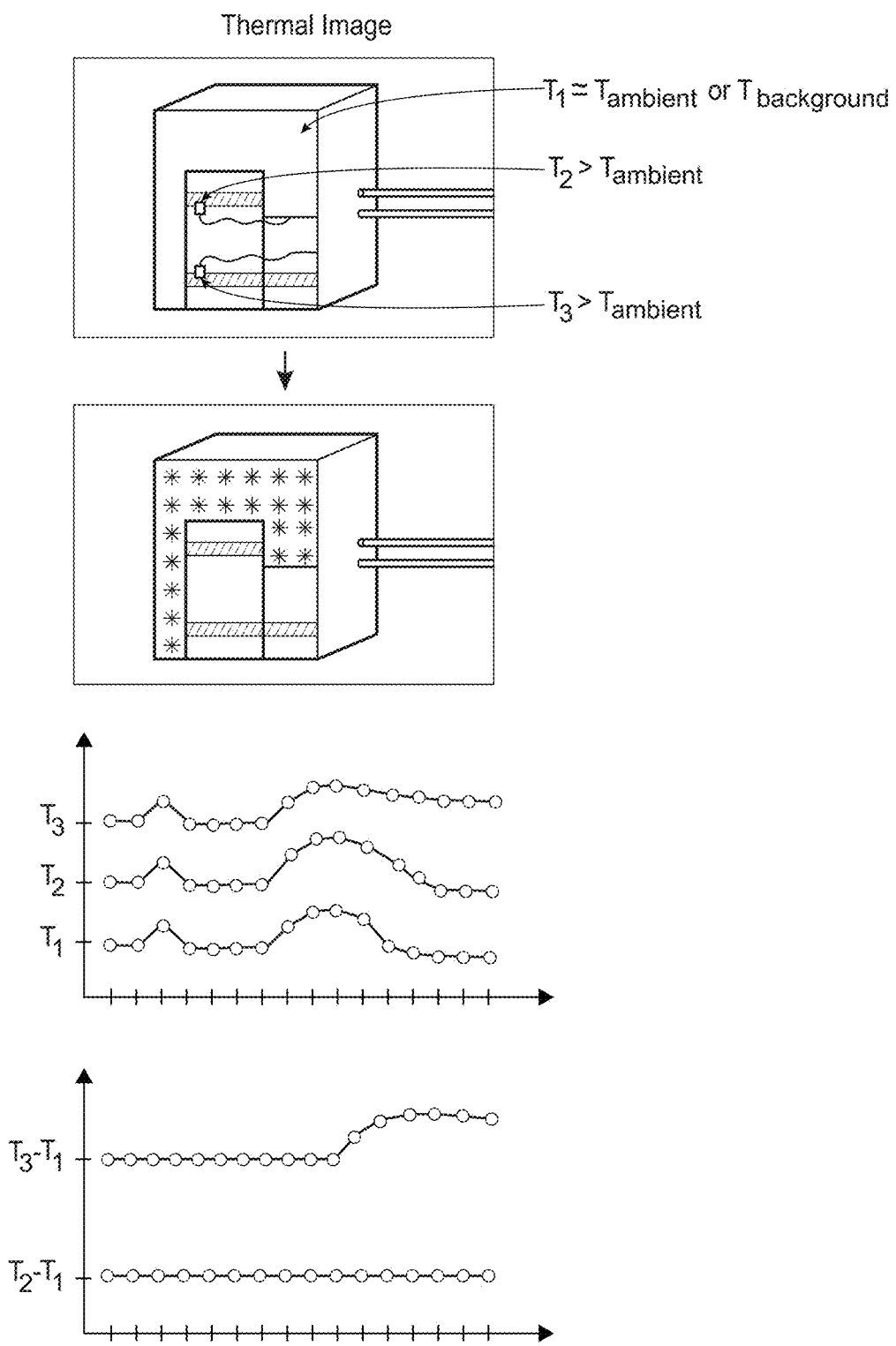
FIG. 12 illustrates an exemplary approach for the correction in changes to environmental conditions in accordance with various embodiments of the invention.

As illustrated in FIG. 12, portions of an asset where temperatures are predominantly driven by changes in the ambient temperature can be discriminated from portions driven by an asset's internal thermal distribution in most cases by comparing the ambient air temperature with surface temperatures and defining a mask covering regions of the asset within the baseline thermal image that are close to ambient air temperature. As illustrated in FIG. 12, the region denoted with pluses ("+") may be viewed as a region of the baseline image that is sufficiently close to ambient air temperatures or can otherwise be used as a surrogate for ambient changes. Regions of an asset that have been previously determined to be predominantly driven by ambient conditions can then be used as a surrogate for ambient temperature conditions and can be considered an ambient temperature measurement.

For example, the operating temperature of semiconductor electronic components is often specified as the junction temperature, which is typically taken to be a function of ambient temperature. The junction temperature is equal to the ambient temperature added to the product of the semiconductor circuit's power dissipation and the junction-to-ambient thermal resistance. Changes in load in an electrical component result in changes in internal power dissipation and heating, while change in load in a mechanical component result in changes in mechanical resistance and heating, thus these can generally be treated in a similar manner such that a reduction in load should result in reduction in internal heating. Load can be reported in several different ways, so it must first be converted to system input power, such as by obtaining the product of the current and voltage used to power the system. Thermal imaging devices are adapted to measure the temperature at an outside surface. This temperature will be between the internal and ambient temperatures. Power flow into or out of a heat dissipator or heat sink inside the asset is proportional to the difference in temperature between inside and outside, and therefore the internal temperature is proportional to dissipated power. Therefore, the temperature map can be partially corrected for load differences by taking the percent difference in load reported for the present measurement and the load reported for the baseline, normal operating, or maximum load, and multiplying the difference in temperature from ambient at each pixel by the inverse of this percent difference. In an example, load and wind speed changes can be applied before correcting each pixel for ambient temperature differences as above. Because many components exhibit a nonlinear response of dissipated power to input power, unless the load is close to the maximum load, a weighting factor is used to indicate the trustworthiness of the corrected data. This simplified correction will result in a level of error that will increase as the change in power from baseline increases. For this reason, after an empirical correction is performed on the thermal image data, an empirical statistical weighting is applied in subsequent analyses of this corrected data.

Conductive heat transfer, the process leading to the equilibrium surface temperature being between the internal temperature and the ambient temperature, follows the same mathematical form as convective heat transfer, the process by which cooling by wind or other fluids reduces the surface temperature from that of the internal temperature. The thermal conductivity of the boundary film is dependent on the wind speed and the asset's surface geometry perpendicular to the flow, the second of which can be impractical to obtain, so a simplified correction factor is applied. This simplified correction will result in a level of error that will increase as the wind speed increases. For this reason, after an empirical correction is performed on the thermal image data, an empirical statistical weighting is applied in subsequent analyses of this corrected data using values obtained from a look-up-table of wind speed versus correction factor and error weighting factor. In a preferred embodiment, an ideal baseline measurement is performed at 100% load (if the asset has such a characteristic) and no wind speed.

In many approaches, there may be changes in the surface condition, including the addition of painting, the loss of painting, corrosion and dirt or dust build-up. A non-thermal image acquisition is used to test if any noticeable change in surface appearance has occurred by examining the color or luminance of the asset in comparison with its local neighborhood. It is understood that in some examples, the color and/or the luminance of the particular asset is examined without regard for the surrounding area. A change in surface appearance could lead to false alarms or missing true positives.

Corrections for ambient conditions rely on various assumptions and in some cases will not be accurate. However, in many cases, the effect on ambient conditions on thermal images of an asset can be determined from a relative calibration based on selected regions of the thermal image data, such that an increase or decrease in the average image temperature in regions that were close to ambient or some uniform temperature in the baseline image are used to test and correct for the presence of a background temperature change contamination. Each of these corrections (for changes in load, wind speed, ambient temperature, relative background) can be performed separately or in combination. As a non-limiting example, the load and wind speed corrections can be performed, followed by either the ambient temperature correction or the relative background correction.

Each pixel in the image can be treated as a separate signal, and the probability distribution of that signal can be computed. The change detection system 122 can rely on any number of approaches, such as taking the first six images acquired, whether the images are of six separate visits or six images taken during the same session, computing the mean and standard deviation over time, and setting a threshold of the mean plus or minus 2 times the standard deviation with an expected false positive level of 5 percent. In this example, it is assumed that the probability density function of the noise is a Gaussian distribution. The standard deviations may also be estimated using prior acquisitions or from factory sensor calibration data. Variation of the threshold, metric used (mean, standard deviation or higher order distribution statistics such as kurtosis) or test used (Kolmogorov-Smirnov test) will also have an impact on results.

A signal-to-noise ratio of each pixel can be increased by image processing such as low-pass spatial image filtering or other noise reduction filters. Where changes in surface conditions that could affect emissivity and therefore thermal measurement accuracy are identified by the change detection system 122, changes in visual appearance from non-thermal image pixels matched to the thermal pixels can occur. The operator can then be notified of the need for inspection on the present asset. The operator can also be notified of a need to re-acquire a baseline value re-baselining.

In some examples, the change detection system 122 can automatically identify change by the statistical analysis of the time series data of each pixel to determine parameters of a probability distribution of that time series or a difference in time series. In these examples, a significant change over time in the parameters is identified, and a significance level of the change is compared with a pre-determined threshold. A statistical comparison may be made between the most recently-acquired image and a subset of the measurements such as the first acquired images (i.e., the baseline images) or the entire set of images or a weighted combination of the images.

In these examples, the statistical threshold can be adjusted by the system operator. For example, if an alarm had been raised by the system for a given asset and subsequent inspection of the asset determined that no de-rating of equipment or preventive action was required following that particular alarm, the operator may want to increase the significance threshold to reduce the likelihood of a further alarm. This adjustment of significance must be carefully monitored, implemented and recorded. Setting thresholds based purely on a lack of observations can result in catastrophic events, thus the system may implement procedures to ensure the change results in additional data collection, asset analysis, logging of the change process, periodically triggering a review of threshold changes, or other preventive behavior.

In some examples, each captured image includes metadata, or header information having additional information relevant for the thermal imaging analysis. The metadata may additionally include commonly stored metadata such as timestamp and location in a suitable image format. The filename of each image data file can include a timestamp, a unique device identifier or UID which may be derived from a WiFi media access control (MAC) address, a unique identifier contained within the controller 102 (e.g., in a microprocessor or non-volatile memory), and can include a string identifying what type of image data is stored, the type of image (e.g., a thermal or non-thermal image, a depth image, or a processed image). In some approaches, additional information can also include a tag describing the scenario being sensed, a tag indicating the processing applied, a linking tag, and tags indicating specific feature descriptors of interest, among other possible tags such as image resolution and approximate focal length. A suitable image format containing these tags is the "Exif" file format extension to the JPEG image file format. It is understood that any other image format allowing for at least one arbitrary tag of at least approximately 20 bytes in size can be used.

In some examples, a networked backend includes any number of computer systems and non-volatile storage systems directed to have a common file storage system for storage and retrieval of image data. In many of these examples, the change detection system 122 can perform these analyses remotely without user intervention upon receiving new thermal imaging data, such that the analyzed data is available at any time. In some examples, a preset alarm may be set such that the change detection system 122, upon performing the analysis remotely, without user intervention, alerts the operator of the alarm condition via email, text or other notification. The alarm condition may be, for example, a new data received alert, information regarding the reproducibility quality of an acquired image, exceeding a temperature or significance threshold, and the like.

It is understood that while many of the embodiments described herein utilize a thermal imaging device having an image alignment system to correct for variances in pose among subsequent image captures, an alternative system may be provided which utilizes a fixed thermal imaging sensor which is permanently or semi-permanently mounted with a particular asset within its field of view. In this example, while the image alignment system is not used, the change detection system may still be incorporated in any manner described herein.

So configured, the system can automatically analyze thermal and/or non-thermal images to detect changes to the assets. The system can generate notifications, alerts, alarms, and/or any other messages to be communicated to an operator so that they can take any appropriate corrective action to the asset.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A thermal imaging system, the system comprising;
    a thermal imaging sensor configured to capture a plurality of thermal images containing thermal data of a plurality of assets in an environment;
    a non-thermal imaging sensor coupled to the thermal sensor, the non-thermal imaging sensor configured to capture a plurality of non-thermal images of the plurality of assets;
    an image alignment system;
    an asset identification system configured to identify a particular asset from the plurality of assets, the particular asset being previously identified by being input into the asset identification system, the asset identification system identifying the particular asset by instructing a user to capture a unique identifier image associated with the particular asset and comparing the capture to a plurality of baseline unique identifier images;
    a controller configured to control operation of the thermal imaging sensor, the non-thermal imaging sensor, and the image alignment system by:
    (i) presenting at least one of a previously-captured baseline image or a template image of the particular asset to the user via a display such that the user may approximate an orientation of a present thermal view of the particular asset and a present non-thermal view of the particular asset to the at least one of the previously-captured baseline image or template image,
    (ii) adjusting the orientation of a present thermal view of the particular asset and the present non-thermal view of the particular asset to match an orientation of at least one of the previously-captured baseline image or template image of the particular asset, and
    (iii) causing the thermal imaging sensor to capture a thermal image of the present thermal view of the particular asset and the non-thermal imaging sensor to capture a non-thermal image of the present non-thermal view of the particular asset; and
    a remote computing device configured to receive the captured thermal and non-thermal images of the particular asset, the remote computing device having a change detection system configured to detect a change in at least one characteristic of the particular asset using the thermal image captured by the thermal imaging sensor.

2. The thermal imaging system of claim 1, wherein the change detection system is configured to generate an image-based threshold using at least one thermal image captured by the thermal imaging sensor.

3. The thermal imaging system of claim 2, wherein the change detection system is configured to detect the change in the at least one characteristic of the particular asset by comparing the image-based threshold to at least one later-captured thermal image.

4. The thermal imaging system of claim 3, wherein the change detection system is further configured to generate a notification when the at least one later-captured thermal image falls outside of the image-based threshold.

5. The thermal imaging system of claim 4, wherein the change detection system is configured to use the thermal data to compute a temperature value of at least a portion of the particular asset.

6. The thermal imaging system of claim 5, wherein the temperature value comprises an average temperature value of all of the thermal data associated with the particular asset provided in the captured thermal image.

7. The thermal imaging system of claim 6, wherein the temperature value comprises an average temperature value of the thermal data associated with at least one pixel of the captured thermal image.

8. The thermal imaging system of claim 2, wherein change detection system is configured to adjust the image-based threshold.

9. The thermal imaging system of claim 1, wherein change detection system is further configured to generate an image-based threshold using at least one non-thermal image captured by the non-thermal imaging sensor and detect a change in at least one characteristic of the particular asset using the non-thermal image.

10. The thermal imaging system of claim 9, wherein the change detection system is configured to use the non-thermal image to determine if a noticeable change in a surface appearance has occurred by examining at least one of the color and the luminance of the particular asset.

11. The thermal imaging system of claim 1, wherein the change detection system is configured to calculate a probability distribution of the thermal data and a standard deviation of the captured thermal image.

12. The thermal imaging system of claim 1, wherein the thermal data further comprises an ambient temperature value representing an ambient temperature of the captured thermal image.

13. The thermal imaging system of claim 12, wherein the change detection system adjusts for a difference in the ambient temperature value of the plurality of captured thermal images by subtracting the difference in the ambient temperature at each acquisition from each pixel of the captured thermal images.

14. The thermal imaging system of claim 12, wherein the change detection system adjusts for a difference in the ambient temperature value of the plurality of captured thermal images by subtracting a change in a background region of the thermal image previously identified to be a surrogate.

15. The thermal imaging system of claim 1, wherein the change detection system is configured to perform an empirical correction on the thermal data based on a change in the environment.

16. A method of repeatably acquiring thermal images in an environment, the method comprising:
   identifying, via an asset identification system, at least one asset being previously identified, the asset identification system identifying the at least one asset by instructing a user to obtain a unique identifier image associated with the at least one asset and comparing the obtained unique identifier image to a plurality of baseline unique identifier images;
   obtaining at least one present thermal view of the at least one asset using a thermal imaging sensor and at least one present non-thermal view of the at least one asset using a non-thermal imaging sensor;
   presenting, via the image alignment system, at least one of a previously-captured baseline image or a template image of the at least one asset to a user via a display such that the user may approximate an orientation of the at least one present thermal view of the at least one asset and the present non-thermal view of the at least one asset to an orientation of the at least one of previously-captured baseline image or template image;
   adjusting, via an image alignment system, the orientation of the at least one present thermal view of the at least one asset and the at least one present non-thermal view of the at least one asset to match the orientation of the at least one of previously-captured baseline image or template image of the at least one asset;
   capturing at least one thermal image of the at least one present thermal view and at least one non-thermal image of the at least one present non-thermal view, the at least one thermal image having thermal image data;
   transferring the at least one thermal image and the at least one non-thermal image to a processing device having a change detection system;
   identifying, using the change detection system, at least one image-based threshold of the at least one thermal image; and
   upon capturing a subsequent thermal image, comparing, via the change detection system, the at least one image-based threshold to a portion of the thermal image data of the subsequently captured thermal image.

17. The method of claim 16, wherein upon the portion of the thermal image data of the subsequently captured thermal image exceeding the at least one image-based threshold, the change detection system is configured to generate an alarm.

18. The method of claim 17, wherein the change detection system is further configured to cause the at least one image-based threshold and the subsequently captured thermal image to be displayed.

19. The method of claim 16, further comprising identifying, using the change detection system, at least one image-based threshold of the at least one non-thermal image, and upon capturing a subsequent non-thermal image, comparing, via the change detection system, the at least one image-based threshold to a portion of image data of the subsequently captured non-thermal image.

20. A thermal imaging device, the device comprising:
   a housing;
   a thermal imaging sensor at least partially arranged on an exterior surface of the housing and configured to capture a plurality of thermal images of a plurality of assets in an environment;
   a non-thermal imaging sensor at least partially arranged on the exterior surface of the housing and coupled to the thermal sensor, the non-thermal imaging sensor configured to capture a plurality of non-thermal images of the plurality of assets;
   an asset identification system configured to identify a particular asset from the plurality of assets, the particular asset being previously identified by being input into the asset identification system, the asset identification system identifying the particular asset by instructing a user to capture a unique identifier image associated with the particular asset and comparing the capture to a plurality of baseline unique identifier images;
   an image alignment system configured to adjust an orientation of a present thermal view of the particular asset and a present non-thermal view of the particular asset to match an orientation of at least one of a previously-captured baseline image or a template image of the particular asset;
   a communication module; and
   a controller configured to control operation of the thermal imaging sensor, the non-thermal imaging sensor, the image alignment system, and the communication module;
   wherein the controller is configured to (i) present at least one of a previously-captured baseline image or a template image of the particular asset to a user via a display such that the user may approximate an orientation of a present thermal view of the particular asset and a present non-thermal view of the particular asset to the at least one of the previously-captured baseline image or template image, (ii) cause the thermal imaging sensor to capture a thermal image of the present thermal view of the particular asset and the non-thermal imaging sensor to capture a non-thermal image of the present non-thermal view of the particular asset and iii cause the communication module to transmit the thermal image and the non-thermal image to a remote computing device, wherein upon receiving the plurality of captured thermal images and the plurality of captured non-thermal images, the remote computing device is configured to initiate a change detection system that detects a change in at least one characteristic of the particular asset using the plurality of captured thermal images and the plurality of captured non-thermal images.

\* \* \* \* \*

UNITED STATES PATENT AND TRADEMARK OFFICE
CERTIFICATE OF CORRECTION

PATENT NO. : 10,116,885 B2
APPLICATION NO. : 15/091317
DATED : October 30, 2018
INVENTOR(S) : Erik Beall It is certified that error appears in the above-identified patent and that said Letters Patent is hereby corrected as shown below:

In the Claims

At Column 17, Line 53, "comprising;" should be -- comprising: --.

At Column 20, Line 60, "iii" should be -- (iii) --.

Signed and Sealed this
Nineteenth Day of April, 2022

Katherine Kelly Vidal
*Director of the United States Patent and Trademark Office*